Dec. 1, 1942. C. A. FLOOD 2,303,346
METHOD OF MAKING LABELS
Filed Dec. 23, 1938 4 Sheets-Sheet 1
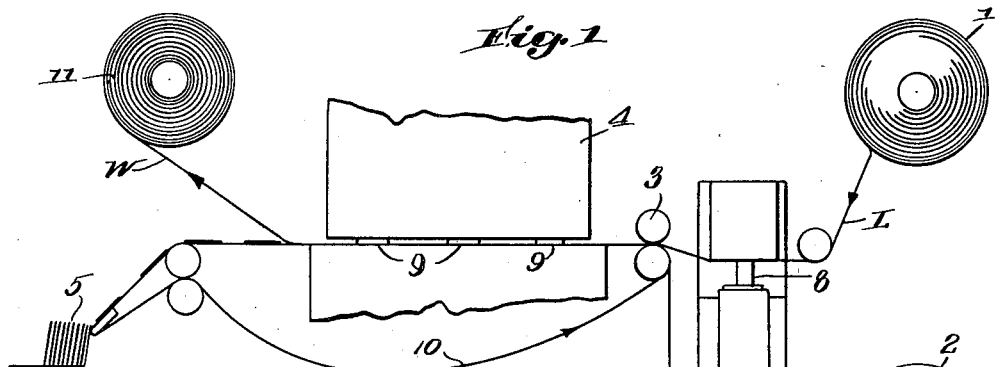
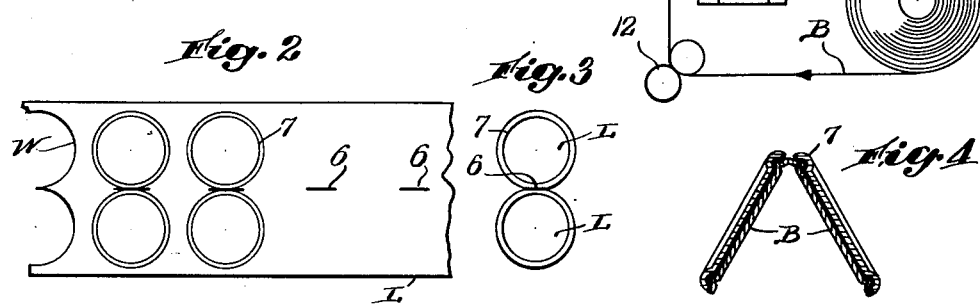
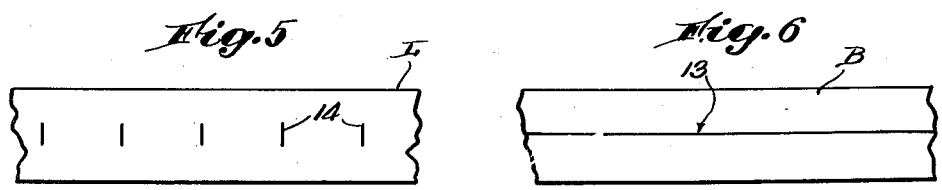
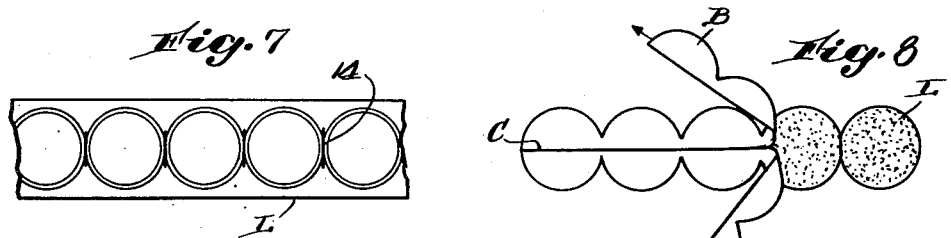
Inventor
Carl A. Flood,
by Roberts, Cushman & Woodbury
his Attys.

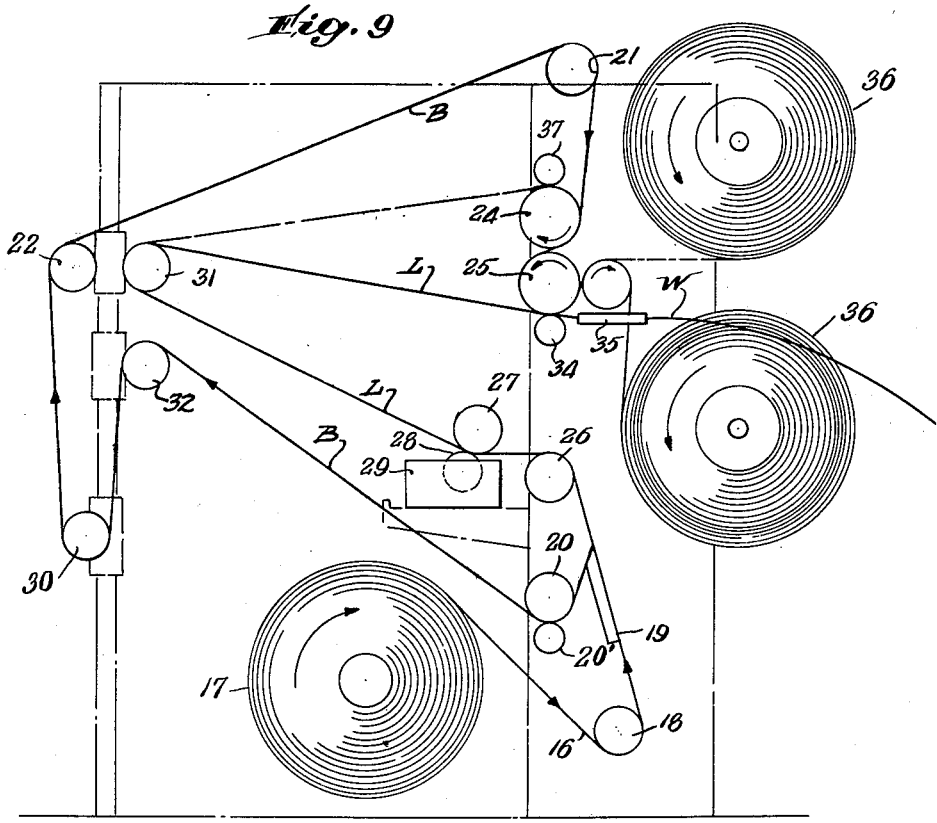

Dec. 1, 1942.  C. A. FLOOD  2,303,346
METHOD OF MAKING LABELS
Filed Dec. 23, 1938  4 Sheets-Sheet 3
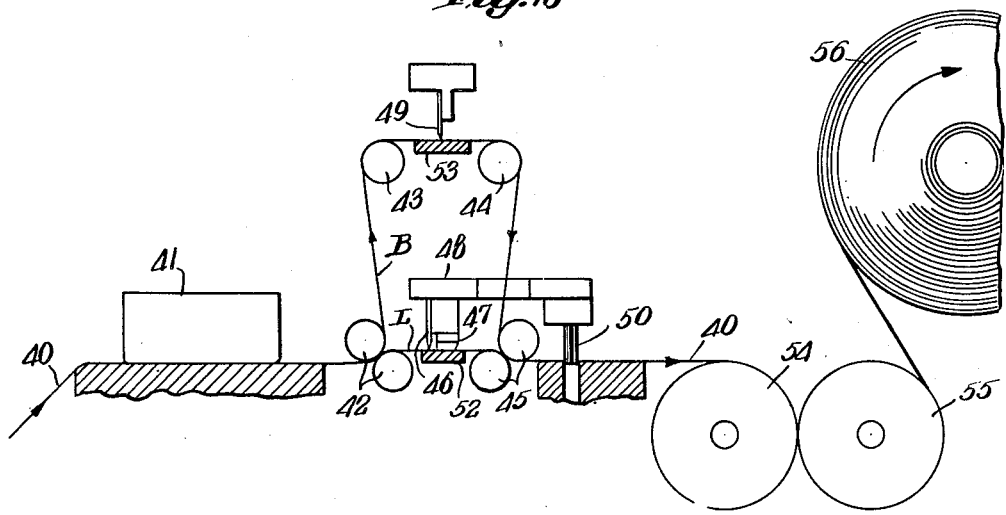
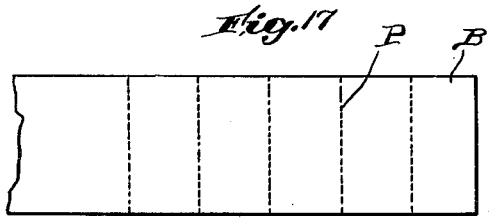
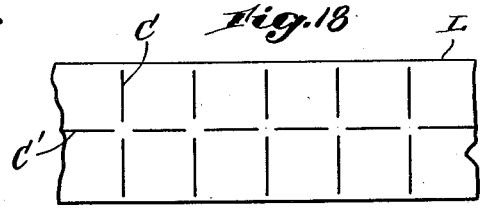
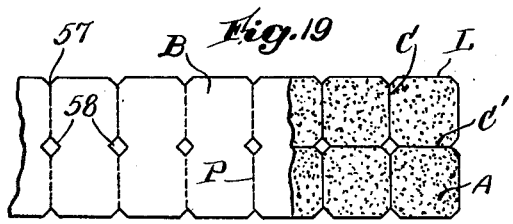
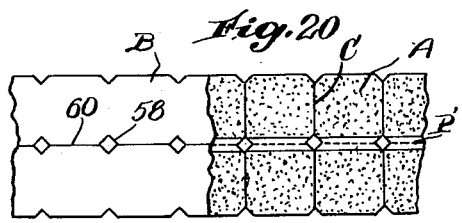
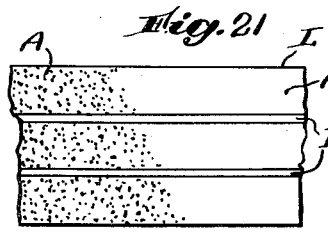
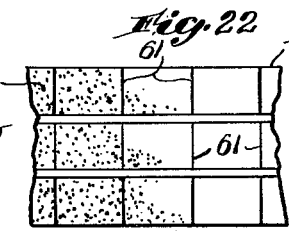
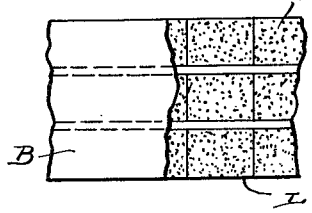
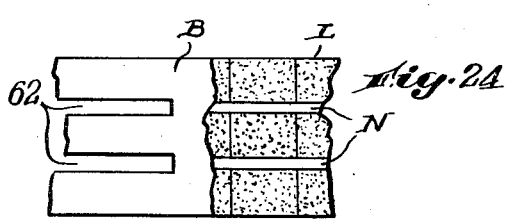

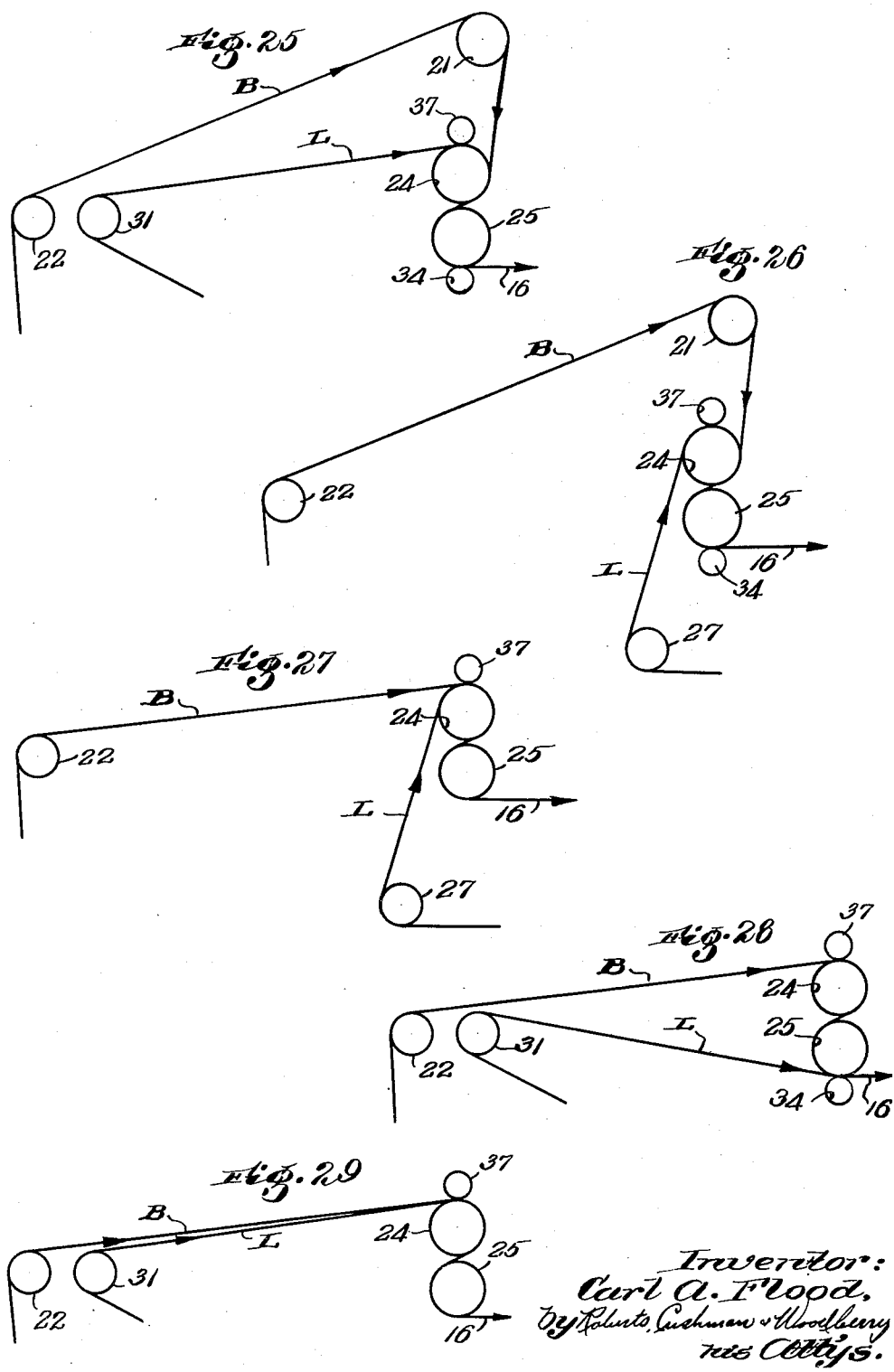

Patented Dec. 1, 1942

2,303,346

UNITED STATES PATENT OFFICE 2,303,346

METHOD OF MAKING LABELS

Carl A. Flood, Framingham, Mass., assignor to Dennison Manufacturing Company, Framingham, Mass., a corporation of Massachusetts Application December 23, 1938, Serial No. 247,491

21 Claims. (Cl. 154—2)

This invention relates to the manufacture of labels having their adhesive sides covered with backing material and more particularly to labels and label strips comprising normally-tacky adhesive which need not be remoistened. Examples of such products are disclosed in my copending application Serial No. 247,490 filed on even date herewith. The object of the present invention is to provide improved methods of manufacturing such labels and label strips.

In one aspect the present invention involves cutting either the label sheet or the backing sheet or both before the two sheets are joined together. The cuts may be continuous or they may be interrupted in the form of dots or dashes. If the sheets are of the elongate type which may be wound in rolls the cuts may extend transversely or longitudinally of the sheets or both transversely and longitudinally of one or both sheets or transversely of one sheet and longitudinally of the other sheet. Preferably the two sheets are coextensive, the label or labels covering substantially all of one side of the backing and the backing covering substantially all of the adhesive surface or surfaces of the label or labels. When the two sheets are superposed at least one cut on one sheet is opposite an uncut portion of the other sheet. In the case of transverse cuts they are preferably spaced longitudinally of the sheets at intervals corresponding to one dimension of the labels.

In another aspect the invention involves embossing or otherwise printing a label or labels on the combined label and backing sheets after one or both has been cut and joined together as aforesaid.

In another aspect the invention involves cutting out labels from the label sheet along portions of their boundaries, then joining the label sheet to its backing sheet and finally cutting both sheets along all or part of the other portions of the boundaries of the labels.

In another aspect the invention comprises the treatment of a longitudinal zone of the label sheet to reduce the adhesiveness of its adhesive surface, this treatment preferably comprising the application of a thin layer of relatively non-adhesive material such as wax, lacquer, tissue paper, etc.

In still another aspect the invention involves feeding the label and backing sheets from a roll to a delivery station along a branch path, peeling the sheets apart and joining them together again at opposite ends of the branches of the path, and in one or both paths cutting or otherwise treating one or both sheets in different ways.

For the purpose of illustration typical embodiments of the invention are shown in the accompanying drawings in which Fig. 1 is a diagrammatic elevation illustrating one method;

Fig. 2 is a face view, from the label sheet side, of an elongate composite sheet adapted to be made in the manner illustrated in Fig. 1;

Fig. 3 is a similar view of a pair of labels died out of the composite sheet shown in Fig. 2;

Fig. 4 is an enlarged section of the pair of labels showing the backing sheet bent at the junction between the two labels;

Figs. 5 and 6 are face views of label and backing sheets respectively adapted to be made in the manner illustrated in Fig. 1;

Fig. 7 is a face view, from the label sheet side, of a composite sheet made from the component parts shown in Figs. 5 and 6, after the sheets have been superposed and after the labels have been printed thereon;

Fig. 8 is a similar view of the opposite side of the composite sheet after the waste material has been trimmed away, the two portions of the backing strip being peeled away from the label sheet at one end;

Fig. 9 is a diagrammatic elevation of another method of manufacture;

Fig. 10 is a face view, from the backing side, of a strip adapted to be made by the method illustrated in Fig. 9;

Fig. 11 is a similar view of a label formed from the strip shown in Fig. 10;

Fig. 12 is an enlarged edge view of the label of Fig. 11, showing the label flexed at the junction between the two parts of the backing sheet;

Figs. 13, 14 and 15 are views like Figs. 10, 11 and 12 showing a modified form of labels and label strip;

Fig. 16 is a diagrammatic elevation showing another method of manufacture;

Figs. 17 to 24 inclusive are face views of different label and backing sheets adapted to be made according to the method illustrated in Figs. 9 and 16; and Figs. 25 to 29 show other ways of threading the apparatus of Fig. 9.

The particular method illustrated in Fig. 1 comprises feeding label and backing sheets L and B from rolls 1 and 2 to a pair of rolls 3 where the two sheets are adhesively joined together by the normally tacky adhesive coating on the lower side of the label sheet L, the composite sheet then feeding through a printer 4 to a delivery station where the finished labels are stacked as indicated at 5. As shown in Figs. 3 and 4 the finished product may comprise a pair of circular labels L separated by a straight cut 6, the two labels being supported in juxtaposed relationship by a portion of the backing sheet B whose outline corresponds to that of the two labels. As indicated at 7 the formation of the labels may include embossing both the label sheet and the backing sheet after the two sheets are joined together. By flexing the backing strip at the junction between the two labels as indicated in Fig. 4 each label may be easily peeled from the backing strip. Referring again to Fig. 1 the cuts 6 in the label sheet are formed by the cutter 8 before the two sheets are joined together at 3. The printer 4 comprises the usual series of printing and embossing dies 9 which successively print and emboss the labels as the composite sheet is intermittently fed through the printer. Feeding through the printer underneath the composite sheet is the usual endless belt 10 which carries the died-out labels from the printer to the stack 5. The waste portion W of the composite sheet is fed from the printer to the take-up roll 11. The cutters 12 for longitudinally slitting one of the sheets are not used in forming the labels shown in Figs. 2 to 4 inclusive but they are used in forming the labels illustrated in Figs. 5 to 8 inclusive.

Referring to the labels illustrated in Figs. 5 to 8 the backing sheet B is slit at 13 by the aforesaid cutters 12 and the label sheet L is provided with transverse cuts 14 by means of a cutter such as shown at 8, the cuts 14 extending transversely of the sheet instead of longitudinally as at 6 in Fig. 2. In passing through the printer 4 circular labels are printed on the composite sheet, the labels being disposed in a single longitudinal row instead of transverse rows as in Fig. 2 and succeeding labels abutting each other along the straight cuts 14. As shown in Fig. 8 the two portions of the backing sheet B on opposite sides of the cut C hold the row of labels together until the two parts of the backing sheet are peeled back, whereupon the labels are successively released.

The method illustrated in Fig. 9 is adapted to accommodate label and backing sheets which have already been united into a composite sheet as indicated at 16. From a roll 17 this material is fed over a roll 18 and thence over a hot plate 19 which, when the sheets are interconnected by thermoplastic adhesive, softens the adhesive sufficiently to permit the two sheets to be peeled apart. One sheet B passes between a pair of feed rolls 20—20' and thence over rolls 32, 30, 22, 21, 24 and 25, and the other sheet L passes over roll 26, thence between rolls 27 and 28 and thence over roll 31 to roll 25 where it rejoins sheet B. By providing a coating tank 29 into which the roll 28 dips, the under side of the sheet L may be coated by roll 28. Beneath roll 25 is one or more cutters 34 which cut through both layers of the composite sheet after the label and backing sheets have been rejoined. Ordinarily two cutters would be provided to trim the margins of the composite sheet, the waste W being discharged through a chute 35 and the composite sheet feeding to one or the other of the take-up rolls 36. A cutter or set of cutters 37 is located above the roller 24 to cut one or the other or both sheets (Figs. 25 to 29). By feeding the label sheet over the roll 26 with its tacky side next to the roll, the roll may serve as a feed roll without the aid of a pressure roll such as shown at 20'; and by feeding the backing sheet under a floating roll 30 differences in stretch between the two sheets is automatically compensated. Instead of applying a non-adhesive stripe with roll 28, the label sheet may be fed into the machine without adhesive and the roll 28 may be used to apply the adhesive coating. If the sheet is to be coated throughout its entire width the roll would then be as long as the sheet is wide, but if the sheet is to be coated in zones with non-adhesive spaces therebetween a series of aligned spaced rolls would be used.

Other ways of threading the apparatus of Fig. 9 are shown in Figs. 25 to 29. In Fig. 25 sheet L passes from roll 31 to roll 24 instead of directly to roll 25, rejoining sheet B at 24 instead of 25. In Fig. 26 sheet L passes directly from roll 27 to roll 24 without passing over roll 31. Fig. 27 differs from Fig. 26 in that sheet B passes directly from roll 22 to roll 24 without passing over roll 21. Fig. 28 differs from Fig. 27 in that sheet L passes over roll 31 and thence to roll 25. And in Fig. 29 sheet L passes from roll 31 to roll 24 instead of roll 25. Thus cutters 37 are inoperative in Fig. 9, they cut sheet L in Figs. 25 and 26, they cut sheet B in Fig. 28, and they cut both sheets in Figs. 27 and 29.

The label strip illustrated in Fig. 10 comprises a backing sheet B slit along the middle as indicated at C and a label strip L coated with adhesive A and having a non-adhesive stripe N extending longitudinally along the middle of the strip, this strip being adapted to make labels such as shown in Figs. 11 and 12. In making the strip shown in Fig. 10 according to the method illustrated in Fig. 9 the label sheet L would be fed under the roll 27 and the non-adhesive stripe N would be formed by coating the adhesive with the roll 28, the width of this roll then being equal to the width of the stripe N, and the backing sheet B would be passed along path 23' where the cut C would be formed by the cutter 37. In this case the label sheet would pass along the path 32—33. The choices between paths 23 and 23' and between paths 33 and 33' depend upon whether one or the other or both of the sheets are to be operated on by the cutter 37; sheets traveling along paths 23' and 33' pass under the cutter whereas sheets traveling along paths 23 and 33 do not pass under the cutter.

In forming labels such as shown in Figs. 13 to 15, where the label sheet L is slit longitudinally at C and the backing sheet B is uncut, the label sheet would pass the cutter 37 and no solution would be placed in the tank 29. The backing sheet B would follow the path 21—23 without being altered from the time it leaves the label sheet until the time it again rejoins the label sheet.

Like the method illustrated in Fig. 9 the method illustrated in Fig. 16 is also intended to utilize a composite sheet of material comprising label and backing sheets which have been previously joined together, the sheets being peeled apart, operated on individually, then rejoined together and, if desired, again operated on together. As illustrated in the figure the composite sheet 40 feeds in from the left, from any suitable source of supply such as a roll or a machine such as shown in Fig. 9, and thence under a weight 41 which serves merely as a drag on the sheet. From the weight 41 the composite sheet passes between two rolls 42 where the two sheets L and B are peeled apart, the sheet L passing directly to the rolls 45 where the two sheets are reunited and the sheet B passing over rolls 43 and 44. Intermediate the rolls 42 and 45 are cutters 46 and 47 mounted on a vertically reciprocating head 48; and between the rolls 43 and 44 is a vertically reciprocating cutter 49. After the two sheets are reunited at the rolls 45 they may be operated on again as for example by means of cutters 50 which may also be mounted on the vertically reciprocating head 48. The cutters 46, 47 and 49 are preferably of the type having knife edges which move down to the platens 52 and 53 respectively under the sheets L and B whereas the cutters 50 are preferably of the punch and die type. After passing the cutters 50 the composite sheet passes over roll 54, under roll 55 and thence to a take-up roll 56.

Typical labels of the type adapted to be made by the method illustrated in Fig. 16 are shown in Figs. 17, 18 and 19 where L represents the label sheet and B the backing sheet. As shown in Fig. 17 the backing sheet B is provided with transverse lines of perforations P at intervals corresponding to one dimension of the labels, and as shown in Fig. 18 the label sheet is provided with transverse cut C at the same intervals and longitudinal cuts C' extending down the middle of the label strip. The perforations P may be made by the cutter 49 and the cuts C and C' by the cutters 46 and 47. After these cuts and perforations have been formed in the two sheets, the sheets are united with the perforations P registering with the cut C. After the sheets are reunited they are notched out at the outer ends of the transverse cuts C as indicated at 57 and the portions of the composite sheet between the ends of the cuts C and C' are removed as indicated at 58. The cuts 57 and 58 may conveniently be made by the cutters 50 in Fig. 16. According to this process the individual labels are partly severed from each other by the cutters 46 and 47 as indicated at C and C' in Fig. 18 and thereafter they are completely severed from each other by the additional cuts 57 and 58 made in both sheets. The preferred method of using the label strips down in Fig. 19 involves first tearing off one piece of backing material along the perforations P, after which each of the pair of labels on that piece of backing material may be peeled individually from the backing material.

The label strip shown in Fig. 20 differs from the strip shown in Fig. 19 in that the perforations P are omitted, instead of the cuts C' the label sheet is provided with perforations P', the backing strip is split down the middle as indicated at 60 and the label sheet is provided with a non-adhesive stripe along its middle portion. The slit 60 may be made by a cutter such as illustrated at 37 in Fig. 9, the non-adhesive stripe N may be applied as illustrated at 28 in Fig. 9 and the cuts C and perforations P' may be made by cutters such as shown at 46 and 47 in Fig. 16. Obviously the same machine may be provided with any suitable combination of these instrumentalities depending upon the particular construction of the label strip to be manufactured. In using the label strip shown in Fig. 20 the two portions of the backing strip on opposite sides of the cut 60 are peeled back to release pairs of labels successively. After a pair of labels is released from the backing strip the two labels may be torn apart along the line of perforations P'.

In making label strips as illustrated in Figs. 21 to 24 the label sheet is first coated with adhesive A except along the non-adhesive zones N and each coated zone A is then slit transversely as indicated at 61. The backing sheet B is then applied and finally both sheets are cut as indicated at 62 in Fig. 24 to remove the non-adhesive zones N, the cuts 62 preferably being slightly wider than the ones N to make sure that the transverse cuts 61 extend throughout the full width of the resulting single-width strips. Instead of leaving the zones N uncoated the entire sheet may be covered with adhesive, all other steps of the process remaining the same. In either case the uncut zones hold the individual labels together until the backing sheet has been applied after which the individual labels are completely severed from each other by the cuts 62.

From the foregoing it will be understood that a characteristic feature of the invention consists in that in the process of feeding the label and backing sheets lengthwise into contact with each other, one of the sheets is slit or otherwise cut while the sheets are being brought together but before they meet. Thus in Fig. 1 the backing sheet B is slit at 12 at the beginning of its transit through the machine; in Fig. 16 the label sheet is cut at 46—47 and the backing sheet is cut at 49; in Fig. 26 the label sheet is slit at 37 and in Fig. 28 the backing sheet is slit at 37.

It should be understood that the present disclosure is for the purpose of illustration only and that this invention includes all modifications and equivalents which fall within the scope of the appended claims.

I claim:

1. In the art of making labels of the type having a coating of adhesive and a backing peelable from the adhesive, the method which comprises covering the adhesive side of a label sheet with a backing sheet and, before the sheets are brought together, slitting the label sheet along a substantially straight line which defines the boundary between juxtaposed labels and which, when the sheets are brought together, is at least in part opposed by an uncut area of the backing sheet.

2. In the art of making labels of the type having a coating of adhesive and a backing peelable from the adhesive, the method which comprises covering the adhesive side of a label sheet with a backing sheet and, before the sheets are brought together, forming in the label sheet, at intervals corresponding to one dimension of the labels, recurrent cuts which define the boundaries between juxtaposed labels and which, when the sheets are brought together, are at least in part opposed by uncut areas of the backing sheet.

3. In the art of making labels of the type having a coating of adhesive and a backing peelable from the adhesive, the method which comprises covering the adhesive side of a label sheet with a backing sheet and, before the sheets are brought together, forming in the label sheet substantially straight parallel cuts which define the boundaries between juxtaposed labels and which, when the sheet are brought together, are at least in part opposed by uncut areas of the backing sheet.

4. In the art of making labels of the type comprising superposed elongate label and backing sheets temporarily secured together with adhesive which is fast to the label sheet but from which the backing sheet is peelable, the method which comprises slitting one sheet longitudinally, cutting the other sheet transversely throughout only a part of its width at intervals corresponding to one flatwise dimension of the labels and then temporarily securing the sheets together with said adhesive so that said splitting is covered by the other sheet.

5. In the art of making labels of the type comprising superposed elongate label and backing sheets temporarily secured together with adhesive which is fast to the label sheet but from which the backing sheet is peelable, the method which comprises slitting the backing sheet down the middle, cutting the label sheet transversely at intervals corresponding to one flatwise dimension of the labels and then temporarily securing the sheets together with said adhesive.

6. In the art of making labels of the type comprising superposed label and backing sheets temporarily secured together with adhesive which is fast to the label sheet but from which the backing sheet is peelable, the method which comprises forming cuts in the label sheet at intervals corresponding to one flatwise dimension of the labels, temporarily securing the sheets together with said adhesive, and then cutting the superposed sheets to form pairs of labels with the labels of each pair meeting at one of said cuts.

7. In the art of making labels of the type comprising superposed elongate label and backing sheets temporarily secured together with adhesive which is fast to the label sheet but from which the backing sheet is peelable, the method which comprises forming in the label sheet, at intervals corresponding to one flatwise dimension of the labels, recurrent cuts which terminate short of the edge of the sheet, thereby partly severing successive labels from each other, temporarily securing said sheets together, and then cutting both sheets along the margin adjacent said edge so that successive labels are completely severed from each other at said margin.

8. In the art of making labels of the type comprising superposed label and backing sheets temporarily secured together with adhesive which is fast to the label sheet but from which the backing sheet is peelable, the method which comprises forming in the label sheet transverse and longitudinal cuts which define rectangles, certain cuts being somewhat shorter than the corresponding dimensions of the rectangles so that the rectangular areas remain interconnected at the corners of certain rectangles, temporarily securing said sheets together, and then cutting both sheets at said corners more extensively to sever said rectangles from each other.

9. In the art of making labels of the type comprising superposed label and backing sheets temporarily secured together with adhesive which is fast to the label sheet but from which the backing sheet is peelable, the method which comprises cutting labels from the label sheet along portions of their boundaries, joining the two sheets together, and then cutting both sheets along other portions of the boundaries of the labels.

10. In the art of making labels from a roll of superposed label and backing sheets temporarily secured together with adhesive which is fast to the label sheet but from which the backing sheet is peelable, the method which comprises feeding the sheets from the roll to a delivery station along a branched path, peeling the sheets apart and joining them together again at opposite ends of the branches of the path, in one branch cutting one of the sheets along one line and, after the sheets are joined together again, cutting both sheets along another line.

11. In the art of making labels from a roll of superposed label and backing sheets temporarily secured together with adhesive which is fast to the label sheet but from which the backing sheet is peelable, the method which comprises feeding the sheets from the roll to a delivery station along a branched path, peeling the sheets apart and joining them together again at opposite ends of the branches of the path, treating a zone of one sheet in one branch to reduce the adhesiveness between the two sheets along that zone and slitting the sheet in one branch along the same zone.

12. In the art of making labels of the type having a coating of adhesive and a backing peelable from the adhesive, the method which comprises covering the adhesive side of a label sheet with a backing sheet and, before the sheets are brought together, partly cutting out labels from the label sheet along abutting parts of the outlines of the labels while leaving the labels interconnected at other portions of their outlines, then applying the label sheet to the backing sheet so that parts of the cuts in the label sheet are opposite uncut parts of the backing sheet and, after the sheets are brought together, cutting both sheets along other parts of the outlines of the labels.

13. In the art of making labels of the type having a coating of adhesive and a backing peelable from the adhesive, the method which comprises covering the adhesive side of an elongate label sheet with an elongate backing sheet and, before the sheets are brought together, partly cutting out labels from the label sheet along abutting parts of the outlines of the labels, while leaving the labels interconnected throughout the rest of their outlines, then applying the label sheet to the backing sheet so that parts of the cuts in the label sheet are opposite uncut parts of the backing sheet and, after the sheets are brought together, cutting both sheets along said rest of the outlines of the labels, whereby the labels, while applied to the backing in sheet form, are entirely severed from each other in the finished product.

14. In the art of making labels of the type having a coating of adhesive and a backing peelable from the adhesive, the method which comprises covering the adhesive side of an elongate label sheet with an elongate backing sheet and, before the sheets are brought together, partly cutting out labels from the label sheet throughout parts of the outlines of the labels, along lines extending transversely of the sheet and along other lines extending longitudinally of the sheet, while leaving the labels interconnected throughout the rest of their outlines, then applying the label sheet to the backing sheet so that parts of the cuts in the label sheet are opposite uncut parts of the backing sheet and, after the sheets are brought together, cutting both sheets along said rest of the outlines of the labels, whereby the labels, while applied to the backing in sheet form, are entirely severed from each other in the finished product.

15. In the art of making labels of the type having a coating of adhesive and a backing peelable from the adhesive, the method which comprises covering the adhesive side of a label sheet with a backing sheet and, before the sheets are brought together, partly cutting out labels from the label sheet along the transverse and longitudinal parts of the outlines of the labels while leaving the labels interconnected at their corners, then applying the label sheet to the backing sheet so that parts of the cuts in the label sheet are opposite uncut parts of the backing sheet and, after the sheets are brought together, cutting both sheets at said corners, whereby the labels, while applied to the backing in sheet form, are entirely severed from each other in the finished product.

16. In the art of making labels of the type having a coating of adhesive and a backing peelable from the adhesive, the method which comprises covering the adhesive side of a label sheet with a backing sheet and, before the sheets are brought together, partly cutting out labels from the label sheet along abutting parts of the outlines of the labels while leaving the labels interconnected at other portions of their outlines and slitting the backing lengthwise, then applying the label sheet to the backing sheet so that parts of the cuts in the label sheet are opposite uncut parts of the backing sheet and parts of said slitting in the backing sheet are opposite unslit parts of the label sheet and, after the sheets are brought together, cutting both sheets along other parts of the outlines of the labels.

17. In the art of making labels of the type having a coating of adhesive and a backing peelable from the adhesive, the method which comprises covering the adhesive side of an elongate label sheet with an elongate backing sheet by feeding the two sheets lengthwise into contact with each other and, before the sheets are brought together, partly cutting out a plurality of rows of labels extending longitudinally of the label sheet with waste zones between the rows, the sheet being cut transversely along the abutting ends of the labels of each row but not across the waste zones, then applying the label sheet to the backing sheet so that the cuts in the label sheet are opposite uncut parts of the backing sheet and, after the sheets are brought together, cutting both sheets at opposite edges of said waste zone, thereby to divide the sheets into a plurality of strips each comprising a row of labels abutting end to end.

18. In the art of making labels of the type having a coating of adhesive and a backing peelable from the adhesive, the method which comprises covering the adhesive side of an elongate label sheet with an elongate backing sheet by feeding the two sheets lengthwise into contact with each other and, while the sheets are being brought together but before they meet, slitting one sheet without likewise slitting the other sheet, bringing the sheets together so that unslit parts of said one sheet are opposed to said slitting, and then slitting both sheets.

19. In the art of making labels of the type having a coating of adhesive and a backing peelable from the adhesive, the method which comprises covering the adhesive side of an elongate label sheet with an elongate backing sheet by feeding the two sheets lengthwise into contact with each other and, while the sheets are being brought together but before they meet, slitting the backing sheet along a line extending lengthwise of the sheets without likewise slitting the label sheet, bringing the sheets together so that unslit parts of the label sheet are opposed to said slitting, and then slitting both sheets along other lines extending lengthwise of the sheets.

20. In the art of making labels of the type having a coating of adhesive and a backing peelable from the adhesive, the method which comprises covering the adhesive side of an elongate label sheet with an elongate backing sheet by feeding the two sheets lengthwise into contact with each other and, while the sheets are being brought together but before they meet, coating one or more longitudinal zones of the label sheet to form alternate adhesive and non-adhesive bands extending lengthwise of the sheets and slitting the backing sheet lengthwise, and then bringing the sheets together with said slitting opposite to said non-adhesive bands.

21. In the art of making labels of the type having a coating of adhesive and a backing peelable from the adhesive, the method which comprises covering the adhesive side of an elongate label sheet with an elongate backing sheet by feeding the two sheets lengthwise into contact with each other and, while the sheets are being brought together but before they meet, coating one or more longitudinal zones of the label sheet to form alternative adhesive and non-adhesive bands extending lengthwise of the sheets and slitting the backing sheet lengthwise, bringing the sheets together with said slitting opposite to said non-adhesive bands, and then slitting both sheets along other lines extending lengthwise of the sheets.

CARL A. FLOOD.